US008104924B2

United States Patent
Chang

(10) Patent No.: US 8,104,924 B2
(45) Date of Patent: Jan. 31, 2012

(54) LED DIAPHRAGM STRUCTURE

(75) Inventor: Nai-Wen Chang, Lujhou (TW)

(73) Assignee: Forward Electronics Co., Ltd., Taipei (TW)

( * ) Notice: Subject to any disclaimer, the term of this patent is extended or adjusted under 35 U.S.C. 154(b) by 410 days.

(21) Appl. No.: 12/461,602

(22) Filed: Aug. 18, 2009

(65) Prior Publication Data

US 2010/0110721 A1    May 6, 2010

(30) Foreign Application Priority Data

Nov. 6, 2008    (TW) .............................. 97219833 U

(51) Int. Cl.
*F21V 7/22*    (2006.01)
*F21S 4/00*    (2006.01)

(52) U.S. Cl. ..... 362/253; 362/234; 362/555; 362/249.02

(58) Field of Classification Search ............. 362/249.02, 362/555, 253, 234, 800, 367, 441, 457, 458, 362/8, 11

See application file for complete search history.

(56) References Cited

U.S. PATENT DOCUMENTS

| 5,965,970 | A  | * | 10/1999 | Takeuchi et al. | ............... 310/324 |
| 7,247,972 | B2 | * | 7/2007  | Nanataki et al. | ............... 310/324 |
| 7,841,751 | B2 | * | 11/2010 | Mulani | ........................ 362/362 |
| 2006/0245184 | A1 | * | 11/2006 | Galli | .............................. 362/208 |
| 2007/0258248 | A1 | * | 11/2007 | Duhe, Jr. | ........................ 362/362 |

* cited by examiner

*Primary Examiner* — Bao Q Truong
(74) *Attorney, Agent, or Firm* — Bacon & Thomas, PLLC

(57) ABSTRACT

An LED diaphragm structure includes an insulation base, a plurality of frames, and a plurality of LED chips, wherein the insulation base includes an upper surface on which a plurality of receiving recesses are provided. The plural frames include a plurality of positive-pole frames and a negative-pole frame, where the positive-pole frames do not contact with the negative-pole frame. The plural frames and the insulation base are formed together as an integral structure. The plural LED chips are correspondingly disposed in the plural receiving recesses of the insulation base, where each LED chip has its positive-pole terminal and negative-pole terminal electrically connected with contact portions of the plural positive-pole frames and of the negative-pole frame, respectively. Accordingly, the plural frames are combined with the insulation base as an integral structure, such that the LED diaphragm structure so assembled can be lightweight and compact.

9 Claims, 4 Drawing Sheets

LED DIAPHRAGM STRUCTURE

BACKGROUND OF THE INVENTION

1. Field of the Invention

The present invention relates to an LED (light emitting diode) diaphragm structure, and more particularly, to an LED diaphragm structure adapted for lightweight and compact electronic appliances.

2. Description of Related Art

Generally, switches, sensors, encoders, or variable resistors of electronic appliances, such as audio, mixing engineering equipment, video/audio equipment, etc., are sometimes incorporated with LED diaphragms so as to provide illumination for dim spots such as theaters or for home video/audio play. Also, LED chips may be controlled to a full bright or a bright spot rotation acting as a news ticker, such that various illumination or luminance effect can be manifested.

However, conventionally, LED diaphragms are combined with encoders into an integral structure, namely, the LED diaphragms and the encoders are modularized into a single structure. This makes it impossible for the LED diaphragms to be used independently, and as such, a poor flexibility for the LED diaphragms.

Moreover, conventionally, after the LED diaphragms have been packaged, the LED diaphragms are then assembled and welded. This also makes it impossibly for the LED diaphragms to be used in lightweight and compact electronic appliances because the LED diaphragms, as a whole, would become too big. Besides, in the assembly of the LED diaphragms, the manufacturing process requires an additional working step, namely, an additional soldering process for assembling the LED chips. As a result, time consumption and cost will be increased, and this is undesirable.

SUMMARY OF THE INVENTION

An object of the present invention is to provide an LED diaphragm structure, comprising an insulation base, a plurality of frames, and a plurality of LED chips, wherein the insulation base includes an upper surface on which a plurality of receiving recesses are provided.

The plural frames include a plurality of positive-pole frames and a negative-pole frame, where the positive-pole frames do not contact with the negative-pole frame. The positive-pole frames each include a contact portion and an exposing portion connected with each other. The negative-pole frame includes plural contact portions and an exposing portion connected with one another. All of the contact portions of the positive-pole frames and of the negative-pole frame are received in the receiving recesses, and that all of the exposing portions of the positive-pole frames and of the negative-pole frame are exposed to outside of the insulation base. The plural frames and the insulation base are formed together as an integral structure.

The plural LED chips are correspondingly disposed in the plural receiving recesses of the insulation base, where each LED chip has its positive-pole terminal and negative-pole terminal electrically connected with contact portions of the plural positive-pole frames and of the negative-pole frame, respectively.

According to the present invention, the plural LED chips are fixed directly into the receiving recesses of the insulation base, and that the plural frames are combined with the insulation base as an integral structure, such that the LED diaphragm structure so assembled can be lightweight and compact and that time consumption and cost for the assembly of the LED diaphragm structure can be reduced and lowered down. Accordingly, the LED diaphragm structure, according to the present invention, can be incorporated with a switch, a sensor, an encoder or a variable resistor so as to enhance flexibility of the LED diaphragm structure.

Further, according to the present invention, the positive-pole frames each further include a connecting section corresponding to the contact portion and the exposing portion of the positive-pole frame, respectively. The insulation base envelopes the connecting sections of the positive-pole frames and as such, an integral structure is formed together with the positive-pole frames.

Still further, according to the present invention, the negative-pole frame further includes a plurality of connecting sections corresponding to the plural contact portions and the exposing portion of the negative-pole frame, respectively. The insulation base envelopes the connecting sections of the negative-pole frame and as such, an integral structure is formed together with the negative-pole frame.

According to the present invention, all of the exposing portions of the positive-pole frames and of the negative-pole frame are bent down so as to insert to a circuit board.

According to the present invention, the LED diaphragm structure may further comprise a light pipe covered on the insulation base for guiding light sources from the plural LED chips.

Further, a pillar may be provided on the upper surface of the insulation base, and that, corresponding to the pillar, there is a hole provided on the light pipe, such that the pillar and the hole are engaged with each other. Of course, to the contrary, the upper surface of the insulation base may be provided with a hole, and that the light pipe be provided with a pillar corresponding to the hole, so that the insulation base and the light pipe can, as well, be engaged with each other.

According to the present invention, the LED diaphragm structure may further comprise an encoder which is assembled on the insulation base, and is electrically connected with the plural LED chips, such that the LED chips are controlled to illuminate bright or dim.

Further, in the present invention, the plural receiving recesses of the insulation base may be annularly and equiangularly arrayed, or equidistantly arrayed, such that illumination of the LED chips may be uniformly arrayed.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
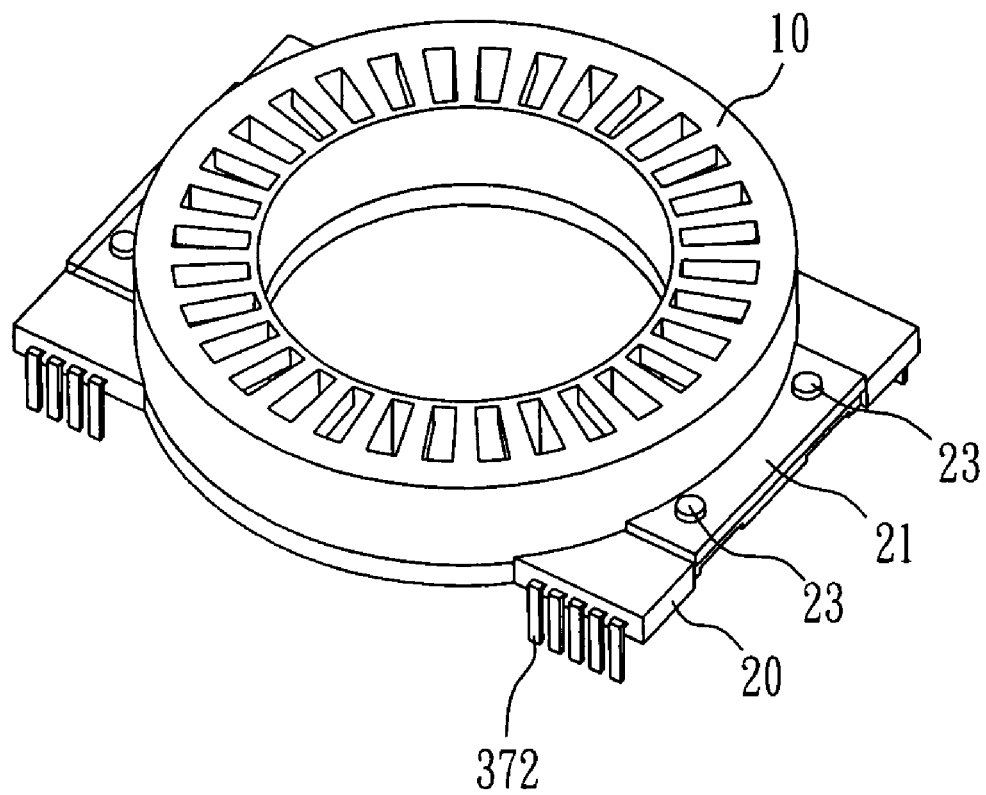
FIG. 1 is a perspective view illustrating an LED diaphragm structure according to the present invention.
Figure 2:
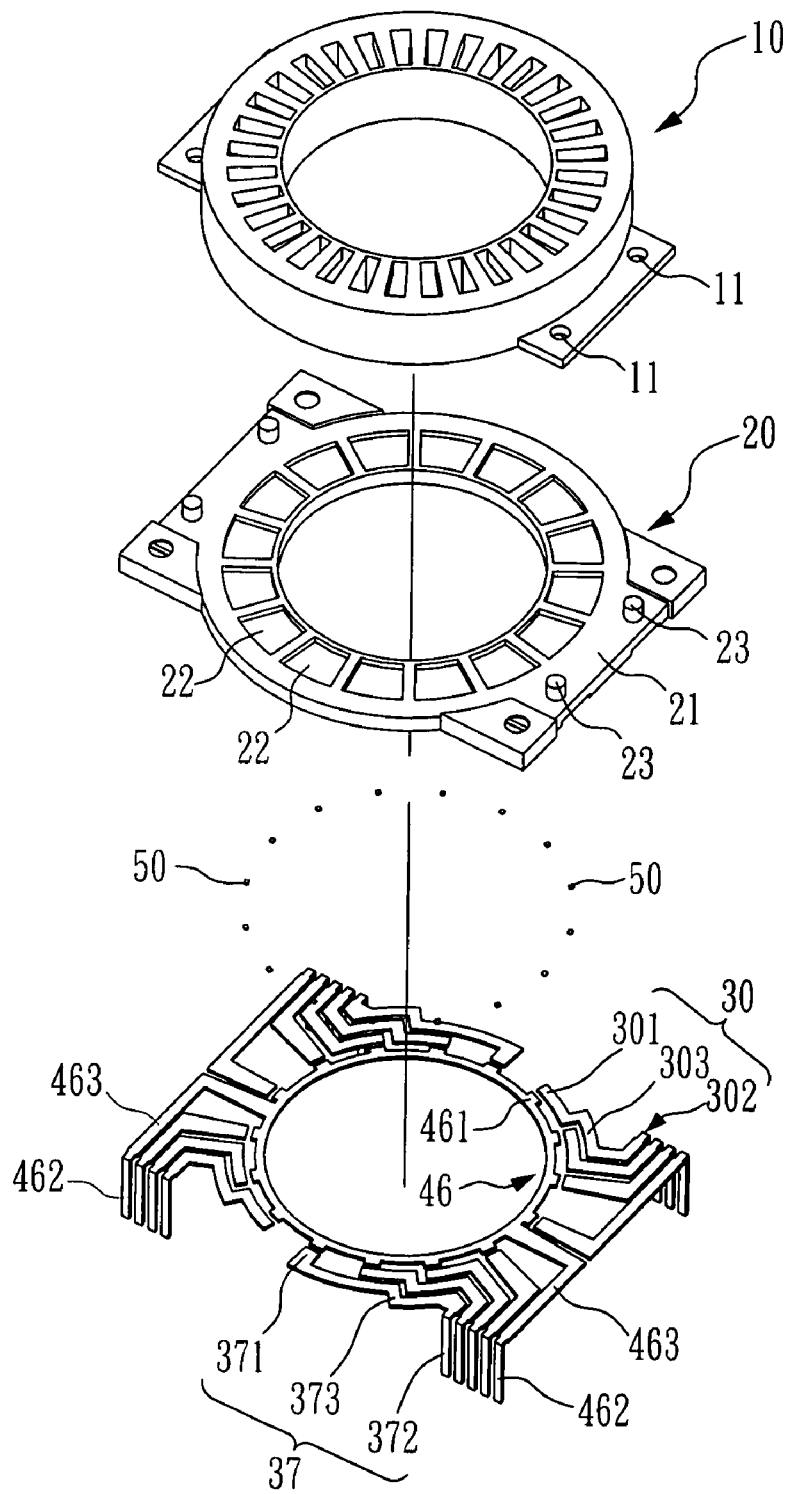
FIG. 2 is an exploded view illustrating the LED diaphragm structure according to the present invention.
Figure 3:
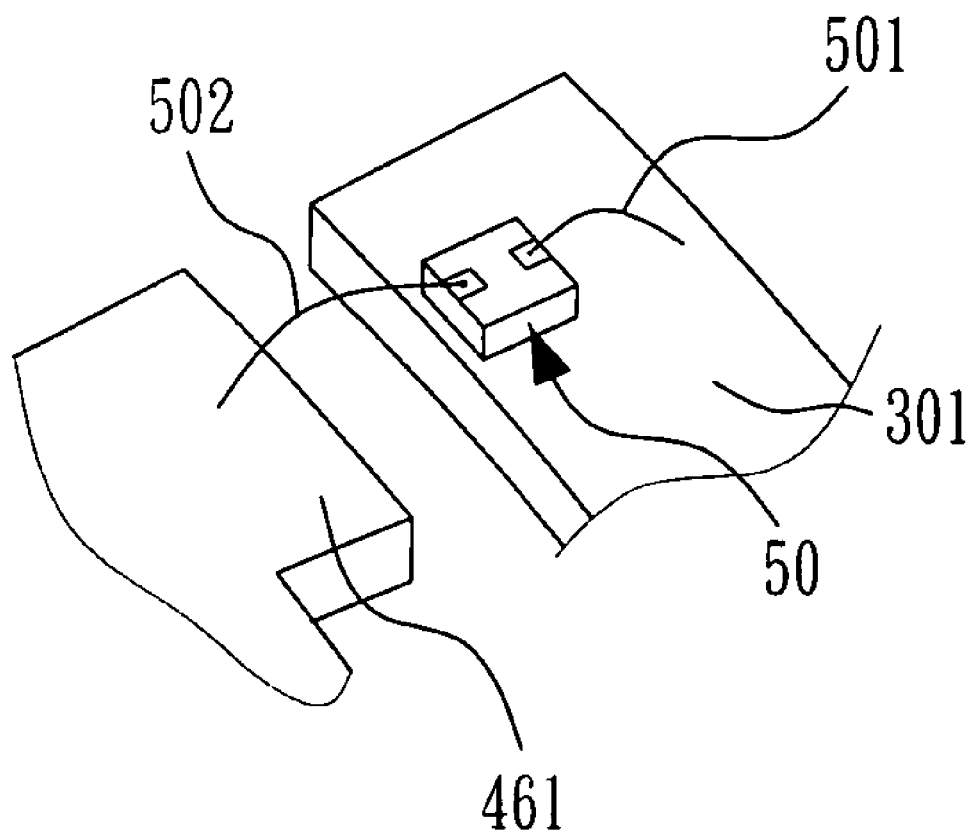
FIG. 3 is a schematic view illustrating an LED chip electrically connected with a positive-pole frame and a negative-pole frame.

Referring to FIG. 1, a perspective view illustrating an LED diaphragm structure according to the present invention, to FIG. 2, an exploded view illustrating the LED diaphragm structure, and to FIG. 3, a schematic view illustrating an LED chip electrically connected with a positive-pole frame and a negative-pole frame, the LED diaphragm comprises an insulation base 20, a plurality of frames 30,37,46, a plurality of LED chips 50, and a light pipe 10.

The insulation base 20 includes an upper surface 21 on which a plurality of receiving recesses 22 are provided. The light pipe 10 covers on the insulation base 20 for guiding light sources from the plural LED chips 50. In the present invention, there are four pillars 23 extending upward from the upper surface 21 of the insulation base 20, and that, corresponding to the four pillars 23, there are four holes 11 provided on the light pipe 10, such that the pillars 23 and the holes 11 are engaged with one another and that the light pipe 10 can be attached to the insulation base 20. Further, there are sixteen receiving recesses 22 on the insulation base 20, and sixteen LED chips 50, where the receiving recesses 22 are annularly and equiangularly arrayed.

As shown in FIG. 2, among the plural frames 30,37,46, there are positive-pole frames 30,37 and a negative-pole frame 46, where the positive-pole frames 30,37 do not contact with the negative-pole frame 46. In the present invention, there are sixteen positive-pole frames 30,37 and a negative-pole frame 46, where only two positive-pole frames 30,37 are exemplified in the drawing. The negative-pole frame 46 is provided with two exposing portions 462.

The positive-pole frames 30,37 each include a contact portion 301,371, an exposing portion 302,372, and a connecting section 303,373 connected with one another. The negative-pole frame 46 includes plural contact portions 461, two exposing portions 462, and plural connecting sections 463 connected with one another. All of the contact portions 301, 371,461 of the positive-pole frames 30,37 and of the negative-pole frame 46 are received in the receiving recesses 22, and that all of the exposing portions 302,372,462 of the positive-pole frames 30,37 and of the negative-pole frame 46 are exposed to outside of the insulation base 20.

As shown in FIGS. 2 and 3, the plural LED chips 50 are correspondingly disposed in the plural receiving recesses 22, where each LED chip 50 has its positive-pole terminal 501 and negative-pole terminal 502 electrically connected with contact portions 301,371,461 of the positive-pole frames 30,37 and of the negative-pole frame 46, respectively.

Further, referring to FIGS. 1 and 2, the insulation base 20 envelopes the connecting sections 303,373,463 of the positive-pole frames 30,37 and of the negative-pole frame 46 and as such, an integral structure is formed. In the present invention, the insulation base 20 is made of insulating plastic material, while the plural frames 30,37,46 are made of electrically-conductive metallic material.

Therefore, in the present invention, the plural LED chips 50 are fixed directly into the receiving recesses 22 of the insulation base 20, and that the plural frames 30,37,46 are combined with the insulation base 20 as an integral structure, such that the LED diaphragms structure so assembled can be lightweight and compact and that time consumption and cost for the assembly of the LED diaphragm structure can be reduced and lowered down. Accordingly, the LED diaphragm structure, according to the present invention, can be incorporated with a switch, a sensor, an encoder or a variable resistor so as to enhance flexibility of the LED diaphragm structure.

As shown in FIG. 2, according to the present invention, all of the exposing portions 302,372,462 of the positive-pole frames 30,37 and of the negative-pole frame 46 are bent down so as to insert to and be electrically connected with a circuit board (not shown).

Figure 4:
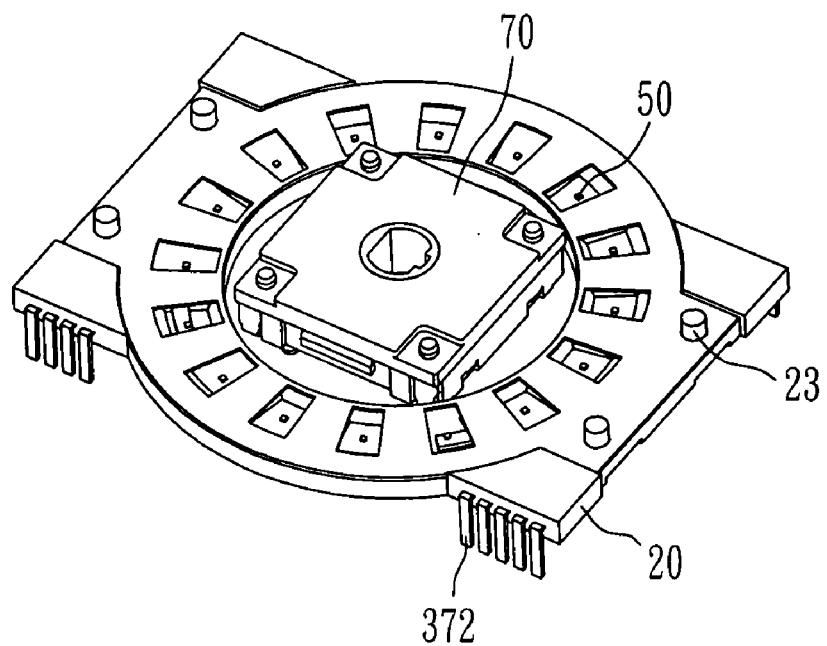
FIG. 4 is a perspective view illustrating the LED diaphragm structure where a light pipe is removed and a sensor is attached thereto.

Now referring to FIG. 4, a perspective view illustrating the LED diaphragm structure where the light pipe 10 is removed and a sensor 70 is attached thereto, because the LED diaphragm structure, according to the present invention, is lightweight and compact, it can be applied to various utilities, for instance, incorporated with the sensor 70. The sensor 70 is arranged on the insulation base 20 and is electrically connected with the plural LED chips 50, such that the LED chips 50 are controlled to a full bright or a bright spot rotation acting as a news ticker, such that various illumination or luminance effect can be manifested.

Figure 5:
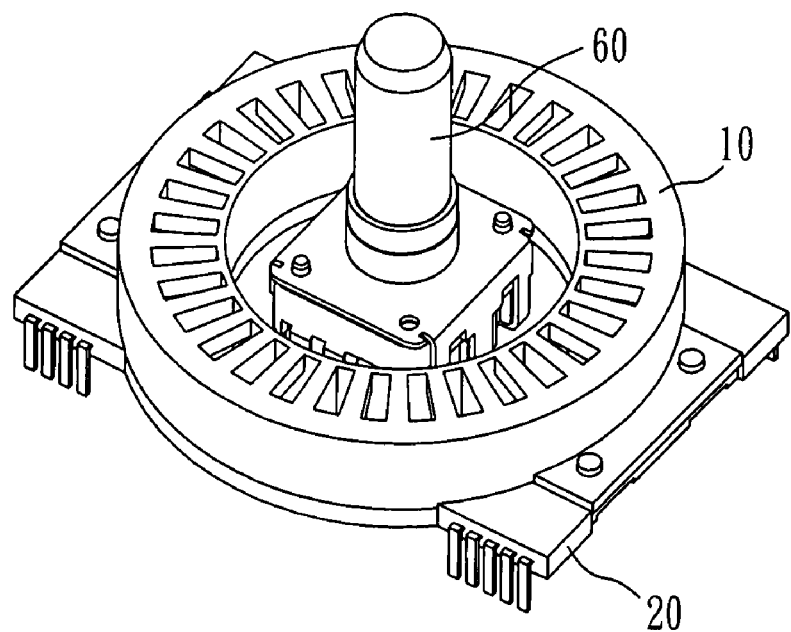
FIG. 5 is a perspective view illustrating the LED diaphragm structure where an encoder is attached thereto.

Further, referring to FIG. 5, a perspective view illustrating the LED diaphragm structure where an encoder is attached thereto, the encoder 60 is assembled on the insulation base 20, and is electrically connected with the plural LED chips 50, such that the LED chips 50 are controlled to illuminate bright or dim, or a bright spot rotation acting as a news ticker, such that various illumination effect can be manifested.

Although the present invention has been explained in relation to its preferred embodiments, it is to be understood that many other possible modifications and variations can be made without departing from the scope of the invention as hereinafter claimed.

What is claimed is:

1. An LED diaphragm structure, comprising:
an insulation base, including an upper surface on which a plurality of receiving recesses are provided;
a plurality of frames, including a plurality of positive-pole frames and a negative-pole frame, wherein the positive-pole frames do not contact with the negative-pole frame, and wherein the positive-pole frames each include a contact portion and an exposing portion connected with each other, and the negative-pole frame includes plural contact portions and an exposing portion connected with one another, and wherein all of the contact portions of the positive-pole frames and of the negative-pole frame are received in the receiving recesses, and all of the exposing portions of the positive-pole frames and of the negative-pole frame are exposed to outside of the insulation base, and the plural frames and the insulation base are formed together as an integral structure; and
a plurality of LED chips, being correspondingly disposed in the plural receiving recesses of the insulation base, wherein each LED chip has its positive-pole terminal and negative-pole terminal electrically connected with the contact portions of the plural positive-pole frames and of the negative-pole frame, respectively.

2. The LED diaphragm structure as claimed in claim 1, wherein the positive-pole frames each further include a connecting section connected with the contact portion and the exposing portion of the positive-pole frame, respectively, wherein the insulation base envelopes the connecting sections and as such, an integral structure is formed together with the positive-pole frames.

3. The LED diaphragm structure as claimed in claim 1, wherein the negative-pole frame further includes a plurality of connecting sections connected with the plural contact portions and the exposing portion of the negative-pole frame, respectively, wherein the insulation base envelopes the connecting sections of the negative-pole frame and as such, an integral structure is formed together with the negative-pole frame.

4. The LED diaphragm structure as claimed in claim 1, wherein all of the exposing portions of the positive-pole frames and of the negative-pole frame are bent down.

5. The LED diaphragm structure as claimed in claim 1, further comprising a light pipe covered on the insulation base for guiding light sources from the plural LED chips.

6. The LED diaphragm structure as claimed in claim 5, wherein a pillar is provided on the upper surface of the insu lation base, and wherein, corresponding to the pillar, there is a hole provided on the light pipe.

7. The LED diaphragm structure as claimed in claim 1, further comprising an encoder which is assembled on the insulation base, and is electrically connected with the plural LED chips, such that the LED chips are controlled to illuminate bright or dim.

8. The LED diaphragm structure as claimed in claim 1, wherein the plural receiving recesses of the insulation base are annularly arrayed.

9. The LED diaphragm structure as claimed in claim 1, wherein the plural receiving recesses of the insulation base are equidistantly arrayed.

* * * * *